Patented May 2, 1939

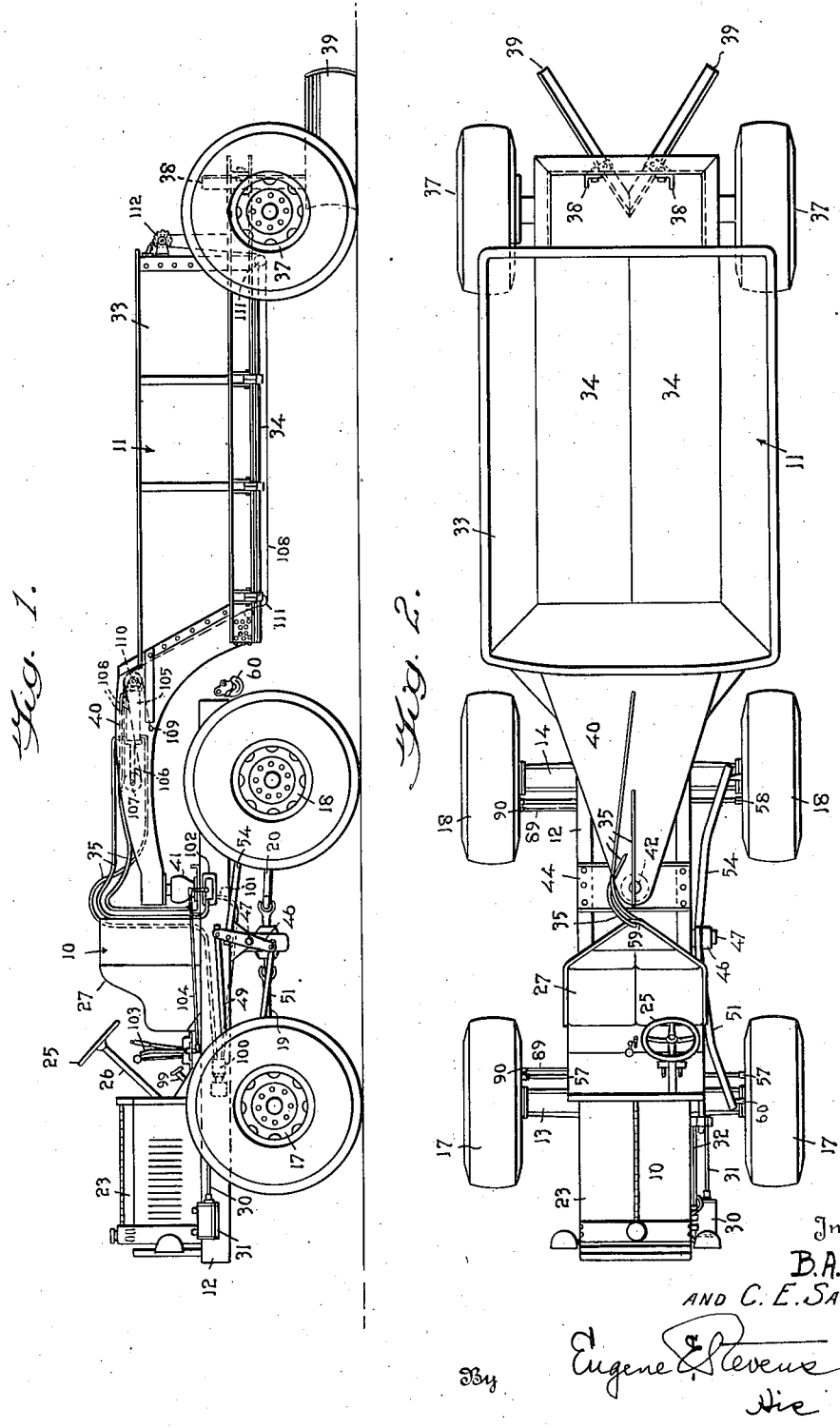

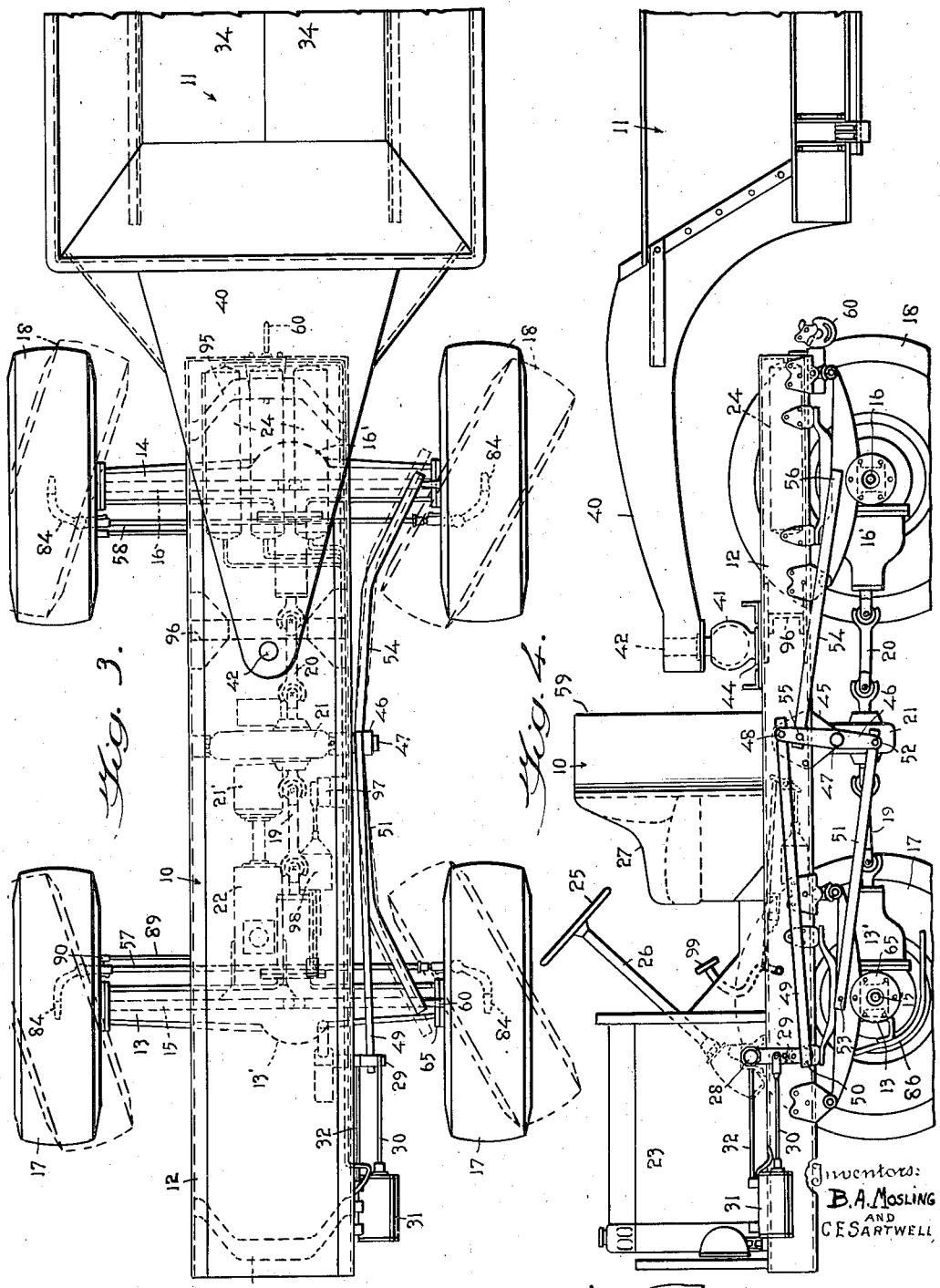

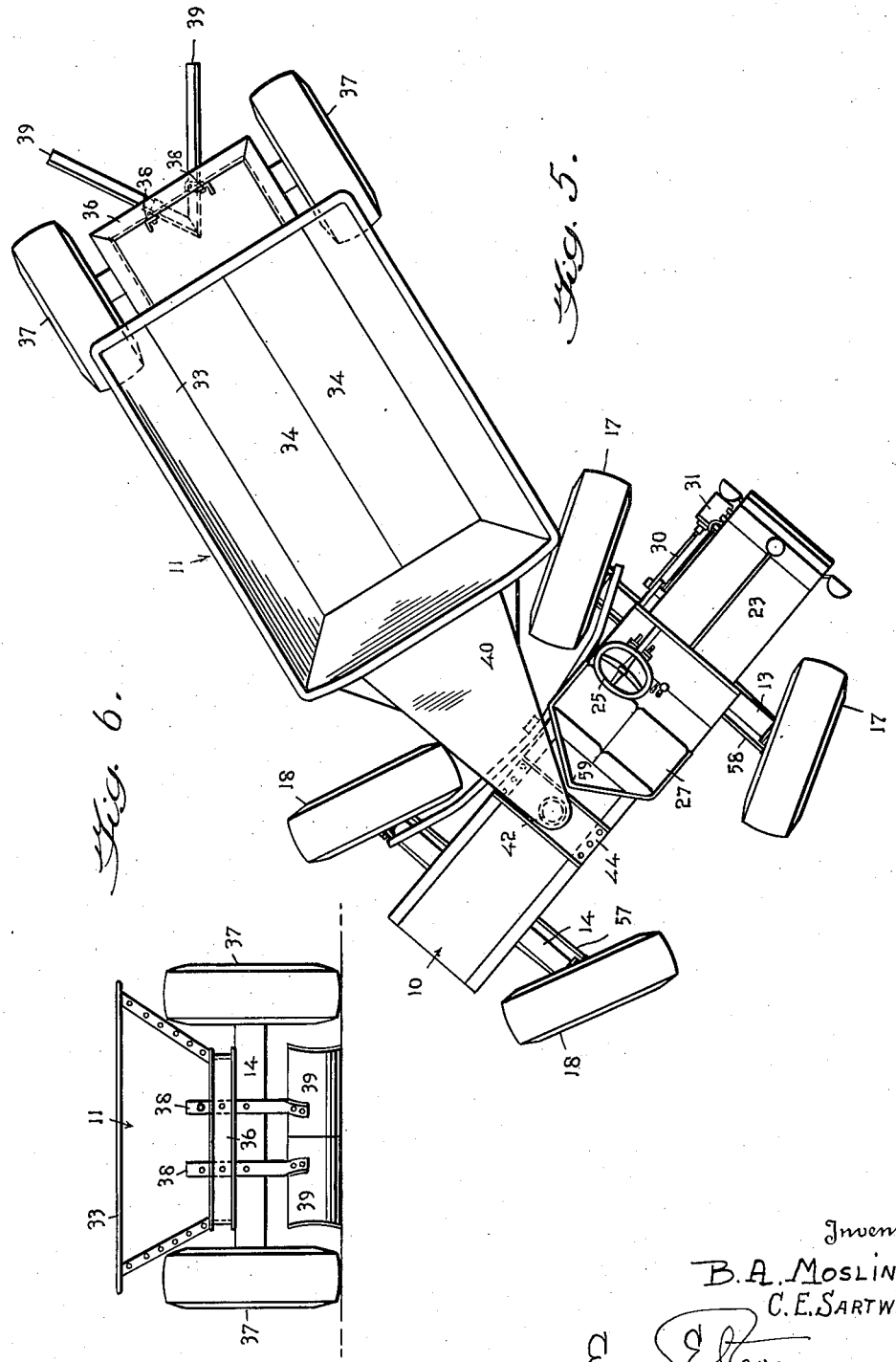

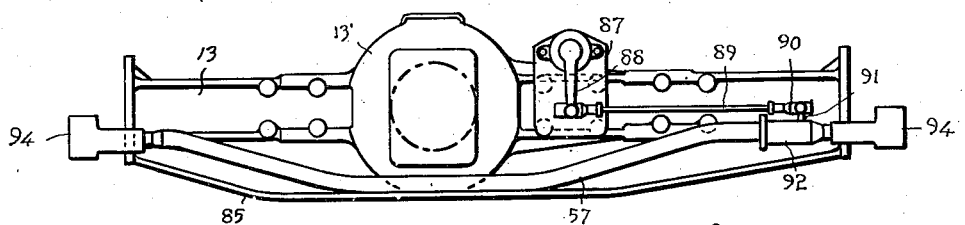
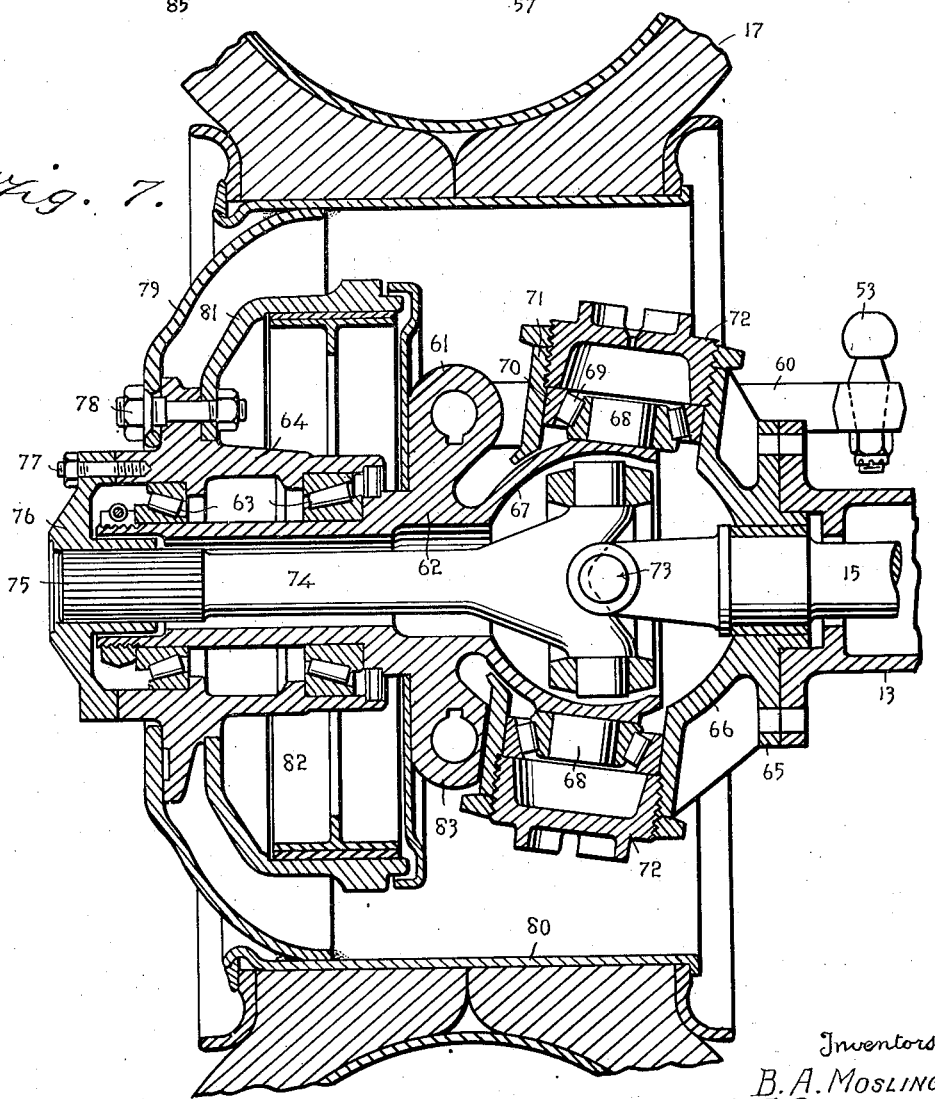

2,156,601

UNITED STATES PATENT OFFICE 2,156,601

SIX WHEELED VEHICLE

Bernhard A. Mosling and Clinton E. Sartwell, Oshkosh, Wis.

Application February 27, 1937, Serial No. 128,242

2 Claims. (Cl. 280—91)

This invention relates to self-propelled land vehicles of the material handling type, as generally employed for the transportation of material such as earth and the like.

An object of the invention is to provide a motor driven six wheeled vehicle wherein four wheels thereof are individually power driven and simultaneously steered, the wheels also being provided with adequate brake means.

Another object is to provide a six wheeled material handling vehicle having a four wheel drive, four wheel steer motor driven load bearing portion articulated relative to a two wheel material containing portion and in a manner to distribute the live weight of the load to all wheels of the motor driven portion.

A further object is to provide in a vehicle of this character a novel steering mechanism whereby in a four wheel drive, four wheel steer unit each longitudinal pair of the driven and steered wheels will track irrespective of the angle at which they may be disposed in operation.

A still further object is to provide a vehicle of this character having a motor driven four wheel drive four wheel steer load sustaining unit wherein the mechanism is arranged so that the vehicle may operate efficiently under any and all conditions of service, the steering and drive mechanism being unaffected by irregularity of ground surface or turning angles.

Other objects will be readily apparent to those skilled in the art.

In the drawings:

Figure 1 is a side elevation of a vehicle as constructed in accordance with the invention.

Figure 2 is a top plan view thereof.

Figure 3 is a top plan view of the motor unit, with portions removed and illustrating the various positions of the elements in steering.

Figure 4 is substantially a longitudinal vertical section taken just inside the left hand wheels.

Figure 5 is a top plan view of the vehicle on a reduced scale and illustrating how the same may be jack-knifed in a turning movement.

Figure 6 is a rear elevation of the material containing portion of the vehicle.

Figure 7 is a vertical section through a wheel and illustrating the mechanism for driving and steering the respective wheels.

Figure 8 is substantially a front elevation of a portion of the front end axle assembly.

In the illustrated embodiment the vehicle comprises a forward motor driven carrier portion 10 and a rearward material containing portion 11, the two portions having an articulated connection. The motor driven portion comprises a chassis frame 12 spring mounted on transversely extending front and rear axle housings 13 and 14, respectively. The axles are of the double reduction full floating type. The front axle housing 13 has disposed therethrough the axle shaft 15 extending oppositely from the differential 13'. Likewise, the rear axle housing 14 has disposed therethrough the axle shaft 16 extending oppositely from the rear differential 16'. The respective axle shafts are in driving connection at their outer ends with steering ends in the vehicle wheels, as detailed in Figure 7, these ends being included in the pneumatically tired front wheels 17 and the pneumatically tired rear wheels 18, each wheel being capable of being steered and being individually driven. The front axle shaft sections 17 are conventionally driven from a forward longitudinal drive shaft 19 from the differential 13' and the rear axle shaft sections 18 are likewise driven from a rear drive shaft 20 extending from the rear differential 16', the two drive shafts being operatively geared in an automatic locking center differential 21 associated with a two speed sub-transmission 21' operatively coupled with main transmission 22 which is connected in the conventional manner with the internal combustion engine, not shown, within the hood 23, by which engine the vehicle is propelled. At the rear of the chassis are disposed a plurality of air reservoirs 24 adapted to be charged by a motor driven compressor, not shown, to furnish power for braking and steering. The steering mechanism is of the combined hand and power type being operated in the usual manner from the steering wheel 25 operating through the steering post 26 adjacent the operator's seat 27 for manipulating in conventional manner a frame-carried lateral steering shaft 28 having fixed thereto a pitman 29 adapted to be power driven from a connecting rod 30 from a piston, not shown, reciprocating within the air cylinder 31 mounted on the chassis frame and having a valve mechanism controlled by a control rod 32 having a driving connection with the shaft 28. The air steering unit thus described is of a known type and the particular details thereof form no part of the present invention except insofar as they enter into the general combination.

The rear or material containing portion of the vehicle comprises a hopper body 33 of the dumping type provided with a pair of bottom forming doors 34 disposed longitudinally of the hopper and pivoted to the side walls thereof to swing downwardly beneath the hopper into open position for discharging a load, the doors when in elevated position meeting at their inner edges to complete the bottom of the carrier. These doors are operated from the driver's seat by hydraulic control means whereby their opening can be regulated through valve or cables of a known type, including hydraulic conduits 35 trained upwardly along the back of the driver's seat to extend rearwardly therefrom as shown in Figure 1. The hopper portion 33 is supported on a chassis frame 36 which mounts the rear axle rearwardly of the hopper carrying a pair of load bearing wheels 37 which, as in the case of those of the motor driven unit 10 are of the pneumatic tired type having balloon tires with relatively large treads of any appropriate design. The rear bar of the frame 36 is provided at transversely spaced points with bracket means supporting vertical posts 38 slidably adjustable in the brackets and carrying at their lower ends the component spreaders 39 disposed in planes that intersect at an acute angle in the longitudinal median of the carrier to provide an adjustable spreader for material dumped from the hopper 33 as the doors 34 are dropped to open position whereby the material is delivered. The spreader members 39 extend rearwardly of the rear end bar of the frame 36 substantially to the back of the bearing wheels 37 so that as the material comprising the load is delivered from the hopper it is spread laterally outward behind the wheels 37 at the desired level and width, filling in the tracks formed by the wheels. The use of spreaders in combination with the material containing portion eliminates the necessity of a subsequent bull-dozing operation in effecting a fill.

The forward end of the material containing portion terminates in a goose-neck 40 that is supported at its forward end on a ball and socket bearing 41 carried by the power unit 10. As shown best in Figure 4, the goose-neck 40 carries at its forward end a fixed depending stud 42 provided with a ball element secured in the socket member 41 that is fixedly carried by a transverse supporting framework 44 extending between the bars of the chassis 12 of the motor unit, the ball and socket joint providing an attaching or draft connection by which the portion 11 is drawn along by the tractive power of the motor unit 10 while being supported thereby. The frame 44 is located just rearwardly of the driver's seat 27 at a point substantially midway of the frame between the front and rear axles so that the weight of the live load in the material portion acting downwardly through the goose-neck 40 is transmitted through the chassis frame to the four individually driven wheels of the motor unit.

The attaching ball and socket connection 41 is, of course, located in the longitudinal median of the motor driven unit and, as previously stated, is nearly as possible toward the center of the chassis frame between the front and rear axles, instead of being disposed directly over the rear axle.

A particular advantage arising from the location of the universal load supporting connection 41 is that, in combination with the drive to all four wheels, each of the four wheels will have traction and power at all times, irrespective of the inclination of the motor driven unit or its angle relative to the material containing portion 11. It will be apparent that even when making the shortest possible turn each wheel of the motor driven unit 10 will have its maximum tractive power.

Intermediate the transverse planes of the front and rear axles the chassis 12 is provided on the left hand or driver's side with a rigidly mounted depending vertical bracket 45 on which is fulcrumed a crank lever 46 pivoted intermediate its ends to rock on its pivot in a vertical plane, the lever 46 being vertically disposed with respect to its supporting bracket. As best shown in Figures 1 and 4, when the four wheels of the motor driven unit are in straight forward position the lever 46 is slightly rocked on its pivot 47 so that it is inclined slightly from the vertical, its upper end being positioned slightly rearwardly and its lower end being positioned slightly forwardly of a vertical plane passed through the pivot 47. At its upper end the crank lever 46 has a ball and socket pivotal connection 48 with the rear end of a drag link 49 whose forward end has a ball and socket pivotal connection 50 with the lower end of the steering arm crank 29 whereby under the movement of the steering arm crank in the steering of the vehicle the drag link 49 will be operated accordingly to rock the crank lever 46 on its fulcrum pivot 47.

The steering mechanism further contemplates an actuator rod 51 having a ball and socket connection 52 at its rear end to the lower end of the crank lever 46 while the upper forward end of the rod has a ball and socket connection 53 to an element of the steering knuckle of the front left wheel. Steering motion of the crank lever 46 is transmitted to the rear left wheel by means of a second actuator rod 54 having at its upper forward end a ball and socket connection 55 with the upper portion of the crank lever 46 and at its lower rear end a ball and socket connection 56 with an operating element of the steering knuckle assembly of the left rear wheel 18. The pivotal connections 52 and 55 at the ends of the actuator rods 51 and 54 are equi-distantly spaced above and below the fulcrum 47 of the crank lever 46 and, when the parts are in the normal straight ahead position of the wheels, the respective plane axes of the rods 51 and 54 intersect the vertical axis of the crank lever 46 at right angles, the two rods being inclined in parallel planes. Transverse tie rods 57 and 58 respectively connect the steering knuckles of the front wheels 17 and the rear wheels 18 so that both wheels of each set are steered in unison. Figure 3 illustrates by dotted line showing the relative position assumed by the steering linkage and wheels during a left forward turning movement.

An important feature of the invention lies in the fact that the back of the driver's seat 27 is substantially V-shaped with the apex thereof disposed rearwardly of the chassis in its longitudinal median and in advance of the ball and socket attaching connection of the goose-neck 40. This angled back of the driver's seat is indicated by the reference character 59 and, as best shown in Figure 5, the angling of the back permits the forward and rear portions 10 and 11 to jack-knife for turning in extremely short arcs as the angled portions of the back of the driver's seat provide clearance for the forwardly extending portion of the goose-neck. At its rear end the chassis 12 mounts a draft coupling 60 so that when desired the goose-neck 40 may be disconnected and the motor unit 10 may be employed in the capacity of a tractor.

As best shown in Figures 3 and 7, the forward end of the actuator rod 51 is, as previously stated, provided with a ball socket to take over the ball stud 53 carried by the end of an arm 60 of the curved type conventionally employed in steering end assemblies and which is attached to a lug 61 carried by a steering skein 62 of hollow construction providing an axially outwardly extending hollow sleeve portion supporting the inner races of a pair of axially spaced bearing assemblies 63 rotatably supporting a wheel hub 64 thereon.

The steering end construction illustrated in Figure 7 is assumed to be that of the left front pneumatically tired wheel 17 and as the structural details are identical in the case of all four wheels, the description of one will suffice for all.

Further with respect to Figure 7 it will be seen that the hollow axle housing 13 at its outer end is adapted to have suitably bolted or otherwise secured thereto an inner attaching flange 65 of a hollow spherical socket 66 that receives the inner ball end 67 of the hub sleeve 62. On its inner end within the socket 66 the ball member 67 is provided with diametrically opposed trunnions 68 inclined with respect to the vertical turning axis of the wheel so that vertical planes passed through the wheel turning axis and the axis of the trunnions 68 will intersect at a point beneath the ground contacting tread surface of the wheel. The trunnions 68 are provided with inner race bearings for roller bearings 69 engaging outer races 70 appropriately secured within cylindrical housing extensions 71 projecting at diametrically opposed points from the socket portions 66 to receive the trunnion and bearing assemblies and open at their outer ends being closed by detachable screw thread closure plugs 72 secured by lock nuts.

The inner attaching flange portion 65 of the socket 66 carries a bearing seating the outer end of the driving shaft 15 which connects at its outer end by means of a universal joint 73 operating freely within the ball and socket portions 66 and 67, with a driven shaft 74 extending outwardly through the sleeve portion 62 out of contact therewith, having its outer end portion formed as at 75 in driving connection with an axially slidable hub cap member 76 adapted to be detachably secured by means of suitable fastening elements 77 to the outer face of an annular extension of the wheel hub 64 so that the driving motion of the shaft 15 is transmitted through the universal joint 73 and the driven shaft 74 through the driving connecting portions 75 and 76 to the hub cap then through its fastening to the wheel hub 64 which has rigidly secured thereto at its outer face portion by means of suitable attaching elements 78 the outwardly dished wheel web member 79 that is spot welded or otherwise rigidly united at its peripheral edge portion with the rim 80 of the wheel. The hub 64 also carries rigidly attached thereto a brake drum 81 for cooperation in a known manner with brake means 82. The skein portion 62 is also provided with a downwardly and vertically extending lug 83 which, as in the case of the lug 61, provides a seat for an arm 84 having its free end pivoted to the transverse tie rod 57 which at its opposite end is in pivotal connection with the similar arm 84 in the steering knuckle assembly of the right front wheel.

It will be apparent that as the arm 60 is actuated by the movement of the actuator rod 51 the wheel will be turned on its vertical axis of turning, pivoting on the trunnions 68 and the turning movement will in no wise effect the power driving connection established through the universal 73 the central pivot of which lies in the axis of the trunnions 68 and whereof the vertical turning axis parallels the vertical axis of the wheel.

The steering end and power drive assembly for the wheel unit, as above described, is of known construction and the individual details thereof form no part of the present invention except insofar as they enter the general combination.

As shown in Figure 8 the front axle housing 13 is provided with a depending longitudinal reinforcing rib 85 and has attached thereto a bulldozing plate 86 which functions also to protect the tie rod assembly from injury when the vehicle is traveling over rough or sandy terrain.

Each axle housing also has secured thereto a hydraulic stabilizing unit 87 of a known construction having a crank 88 operatively connected to a stabilizing rod 89 having a pivotal connection 90 with a ball stud 91 carried by an adjustable connection 92 forming a part of the tie rod. The member 92 may be adjusted longitudinally of the tie rod to accommodate for wear and loose play between parts so that the wheels move in unison under all conditions of operation when turning. At its outer ends each tie rod extends beyond the attaching flange of the axle housing, being provided with socket members 94 each seating an element of the adjacent wheel arm 84 so as to establish a pivotal connection between these parts.

As best shown in Figure 4, the steering knuckle engaging ends of the actuator rods 51 and 54 operatively connect with the wheel steering arms 60, see Figure 7, in a common horizontal plane. This common horizontal plane is also occupied by the pivot fulcrum 47 of the crank lever 46. Due to the pivotal connection of the actuator arms at their ends respectively with the crank lever 46 and the steering arms 60 at the wheels the independent vertical movement of the respective wheels due to irregularity of ground surface conditions has no effect on the steering movement for the actuator rods are permitted to rock through vertical arcs to compensate for such movement. In consequence, the wheels will track absolutely irrespective of their degree of turning movement and irrespective of any vertical differential between the individual wheels.

Due to the ball and socket connection between the goose-neck of the load carrier portion and the approximate center of the motor unit the vertical stress of the active load in the material containing unit is constantly distributed to the four individually driven wheels of the power unit so that maximum tractor efficiency is obtained which exists continuously during operation and without regard to inclination of the power unit in ascending or descending the sides of slopes, or its turning angle. Were the goose-neck connection mounted directly over the rear axle it is evident that the live load distribution would thus be unequal and when the power unit should happen to be climbing at any appreciable angle there would be a tendency for the same to rear back upon itself pivoting on the rear axle at least to the extent that the forward wheel would have no tractive effect and their steering movement would be very greatly impaired.

An important feature of the invention resides in the peculiar conformation of the goose-neck 40 and the forward end of the rear material carrying portion 11. As shown best in Figure 4, the goose-neck 40, constituting as it does a forwardly extending tongue member, is arcuately undercut and extends forwardly from the top of the carrier 11 so that there is ample vertical clearance between the under side of the goose-neck tongue and the chassis 12 and the rear wheels 12 in any position assumed in steering. As shown in Figure 5, the turning radius of the vehicle is limited only by engagement of a side edge of goose-neck tongue 40 with one of the inclined faces of the back of the driver's seat. This is due to the play afforded by the goose-neck 40 and the angled arrangement of the back of the driver's seat, permitting a far shorter turning radius in vehicles of this character than has hitherto been capable of accomplishment in this art.

Another important feature resides in the fact that the load of the motor in the hood 23 is directed forwardly of the front wheels so that without a compensating load at the rear the chassis 12 would tend to rise at its rear end pivoting on the front axis. The load supporting ball and socket connection between the goose-neck tongue 40 and the chassis 12 well forwardly of the rear wheels brings the live load of the material portion 11 into play as a compensating load which restrains the chassis 12 from riding in the manner described and forces the rear wheels 18 into effective traction engagement with the ground, just as the weight of the motor influences the forward wheels 17 into effective traction engagement. Thus the live load of the material in the portion 11 and the dead load of the motor are correlated to distribute the load over the four independently driven wheels of the power unit, maintaining the same in tractive engagement with the ground under any conditions encountered in service.

The sub-transmission 21' having the automatic locking differential serves to equalize the power between the front and rear axles thus automatically regulating the distribution of power. In addition to this feature the motor driven unit 10 is further adapted to travel over rough ground by the flexibility of its chassis construction. As will be seen in Figure 3, the chassis 12 consists of two side bars connected only by the transverse braces 95 located at each end and an intermediate flexible brace 96 substantially under the transverse support 44 which carries the universal load supporting connection 41. The chassis side bars are not connected at any other point. Due to this arrangement the frame is susceptible of a high degree of flexibility so that it may be operated at maximum efficiency over exceedingly rough ground. Furthermore, the chassis frame itself is of double channel construction consisting of inner and outer channels arranged in nested relation and the two members being constructed of metals having different characteristics.

The air brake mechanism is of a conventional type employing a master cylinder 97 operatively connected with a power cylinder 98 for actuating the brake rigging, not shown, in accordance with manipulation of the brake pedal 99 mounted in the conventional manner.

An important feature of the invention resides in the hydraulic operating means for controlling the bottom doors 34 of the material containing unit 11. The hydraulic conduits 35, previously noted, are arranged in communication with a hydraulic pump 100 driven from a power take-off of the transmission, not shown, the pump being in connection through a conduit 101 with a hydraulic valve 102 of a known type mounted on the chassis 12 substantially adjacent the support of the frame 44. The valve 102 is operated from a control lever 103 arranged adjacent the driver's seat and having an operating rod 104 connected with the hydraulic valve.

The hydraulic conduits 35 are operatively connected in the usual manner with the cylinder of a hydraulic ram 105 carried in the goose-neck 40, the piston rod 106 of which carries at its outer end a shiftable pulley 107 which has trained thereover a flexible cable 108, one end of which is fixedly anchored to bolting means 109 located in the goose-neck. The cable 108 after it leaves the shiftable pulley 107 is trained rearwardly over an idler pulley 110, the cable branching to extend downwardly through the goose-neck and rearwardly over idler pulley 111 carried by the meeting edge portions of the doors 34 at their front and rear ends, the cable being trained from the rearmost pulley 111 upwardly over a manually operable windlass 112 mounted on the rear of the hopper body 33, the cable being anchored at its end to an appropriate portion of the frame.

From this construction it will be apparent that as the hydraulic valve 102 is operated in accordance with movement of the operator's control lever 103, the hinged bottom doors 34 will be dropped or raised to the desired degree as the cable is slackened or drawn up under the movement of the shiftable pulley 107 operated by the ram 105. The bottom doors may be opened to any degree so that the load within the material portion 11 may be distributed over as large an area as may be desired having regard to the capacity of the hopper body and the extent of opening of the bottom doors.

The entire operation of the various mechanisms by which the vehicle is steered, driven, and the load discharging bottom doors are manipulated under the control of the driver thus makes the entire assembly essentially a one man operated mechanism wherein everything is under the control of the operator and without the necessity of leaving the driver's seat.

We claim:

1. In a wheeled vehicle, a chassis, front and rear axles associated therewith, a wheel at each end of said axles, a depending bracket carried by one of the side bars of the chassis midway between the front and rear axle, each said wheel being mounted relative to its axle for steering movement, a crank lever fulcrumed intermediate its ends on said bracket, an actuator rod having pivotal connection with said lever at one side of its fulcrum and with a steering element of one wheel, an actuator rod having pivotal connection with said lever on the opposite side of its fulcrum and with a steering element of another of the vehicle wheels, steering means carried forwardly of the vehicle beyond the front axle, a link operatively connecting said steering means and said crank lever at one end of the lever for rocking the same on its pivot whereby to move said wheels simultaneously through oppositely directed identical arcs, and tie-rods extending transversely of the chassis between transversely aligned pairs of the wheels for moving the pairs in unison.

2. In a wheeled vehicle, a chassis, front and rear axles associated therewith, wheels at each end of said axles and mounted thereon for steering movement, steering means forwardly of the vehicle, a vertically depending bracket carried by the chassis at one side thereof and intermediate the front and rear axles, a crank lever fulcrumed intermediate its ends on said bracket and having a position inclined slightly from the vertical when the vehicle wheels are in straight ahead position, an actuator rod having pivotal connection with one end of said crank lever and with a steering element of one wheel, an actuator rod having pivotal connection with the crank lever adjacent its other end and with a steering element of another of the vehicle wheels, a link operatively connecting said steering means and the upper end of said crank lever for rocking the same on its pivot whereby to move said wheels simultaneously through oppositely directed identical arcs, tie-rods extending transversely of the chassis between transversely aligned pairs of the wheels for moving the pairs in unison, and the fulcrum of said crank lever being disposed in a horizontal plane common to the points of pivotal connection of said actuator rods with the steering elements of their respective wheels.

BERNHARD A. MOSLING.
CLINTON E. SARTWELL.